Oct. 26, 1937.      J. F. BATES      2,097,014

MEANS FOR CONTROLLING THE REAR LAMP OF MOTOR VEHICLES

Filed Jan. 27, 1937      2 Sheets-Sheet 1

J. F. Bates
Inventor

By Glascock Downing & Seebold
Attys.

Oct. 26, 1937.    J. F. BATES    2,097,014
MEANS FOR CONTROLLING THE REAR LAMP OF MOTOR VEHICLES
Filed Jan. 27, 1937    2 Sheets-Sheet 2

J. F. Bates
Inventor

By Glascock Downing & Seebold
Attys.

Patented Oct. 26, 1937

2,097,014

UNITED STATES PATENT OFFICE 2,097,014

MEANS FOR CONTROLLING THE REAR LAMP OF MOTOR VEHICLES

James Frederick Bates, Johnsonville, New Zealand

Application January 27, 1937, Serial No. 122,674
In New Zealand October 4, 1935

1 Claim. (Cl. 177—352)

This invention relates to means for controlling the tail light of motor vehicles in order to meet the requirement of traffic regulations.

In some countries traffic regulations provide that the tail light must be such that it cannot be switched off from the driver's seat, or by inside control, but that it can only be switched off from the exterior at the rear of the vehicle.

The object of the present invention is to enable the tail light to be switched on from the interior of the vehicle when the head lamps of the vehicle are switched on, but not to be switched off when the head lamps are switched off.

According to the present invention, means are provided whereby the tail light will be lit by and through the dash board control when the light switch thereon is actuated to turn on the vehicle head lamps. The means are of such a nature that when the tail light is once switched on, it cannot be switched off except by operation from the exterior and rear of the vehicle, thus entailing the need of the motorist to stop and alight for that purpose.

Examples of carrying out the invention will be described with the aid of the accompanying drawings, wherein:—

Figure 1:
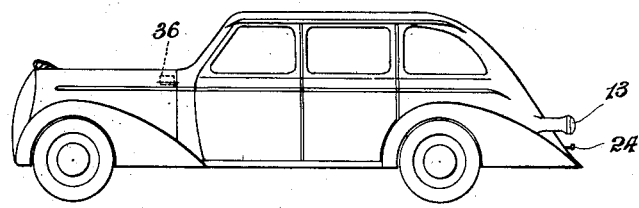
Figure 1 is a view of a vehicle showing the position of the magnetic switch and of the switch for extinguishing the tail light.
Figure 2:
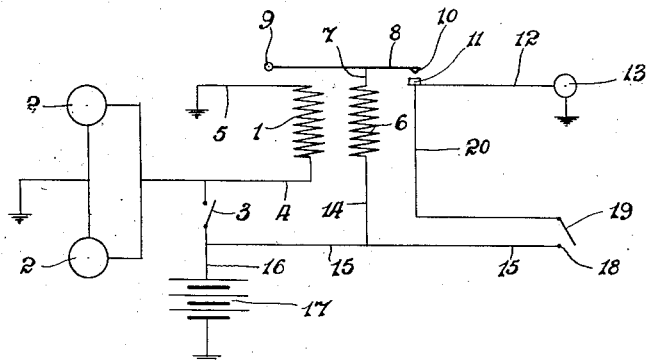
Figure 2 is a diagram of the electrical circuits.

Referring to the drawings and first to Figures 1 to 4, a potential coil 1 has one end connected to the circuit of the head lights 2 on the headlight side of the light switch 3 by a wire 4 and has its other end earthed to the vehicle frame by a wire 5. A series coil 6 which would conveniently be wound on the exterior of the coil 1 (as in Figure 3) in the well-known manner of relays has one end 7 connected to a contact arm 8 which is in the nature of an armature and is placed in relation to the coils so that it is magnetically sensitive to them. One end of the arm 8 is pivotally supported as indicated diagrammatically at 9 (Figure 2) and the other end of the arm has a contact 10 adapted to make or break connection with a contact 11 from which leads a wire 12 to the tail lamp 13 which is earthed to the vehicle frame in the usual way. The other end of the coil 6 is connected by a wire 14 to a wire 15 which is connected to the wire 16 from the battery 17, and which extends to the rear of the vehicle to a contact 18 with which a normally open spring operated contact switch arm 19 (see Figure 4) is adapted to make contact. Another wire 20 leads from the contact 11 to the switch arm 19 and forms, with the wire 15 and arm 19, a normally open circuit which becomes a shunt path around the coil 6 when the switch arm 19 is closed. The switch arm 19 is contained in a casing 21 (see Figure 4) through which a push rod 22 is slidable but normally held away from the arm 19 by means of a coil spring 23 in compression between the casing 21 and the button 24 on the end of the rod, the two wires 15 and 20 being attached to insulated terminals for the contacts 18 and 19 in the casing 21.

The casing 21 would be attached to a convenient rear part of the vehicle near the tail light (see Figure 1) so that the push button 24 can be readily operated when the light is to be switched off.

Figure 3:
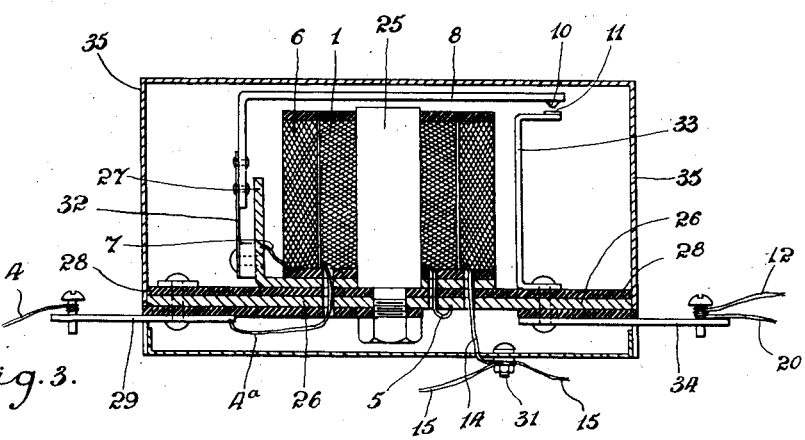
Figure 3 is a cross section through the magnetic switch.
Figure 4:
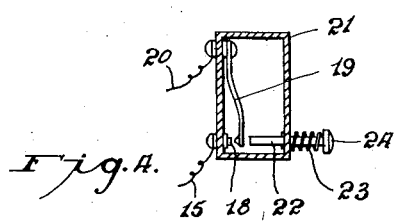
Figure 4 is a section of the rear switch.

In Figure 3 the magnetic switch is shown, the connecting wires which correspond to those in the diagram having the same numerals as the lines in the diagram. This switch consists of a soft iron core 25 mounted on a base plate 26 and having the coils 1 and 6 wound thereon in the usual way. The coil 1 is connected by a wire 4ª to a plate 29 from which wire 4 leads, this plate being separated from plate 26 by insualtion, while the other end of the coil is earthed to the plate 26 by wire 5, the plate 26 being in metal contact with the cover 35 which in turn will be in metal contact with the vehicle frame. One end of the coil 6 is connected by the wire 7 to a bracket 27 separated from the plate 26 by insulation 28, while the other end of the coil 6 has a wire 14 leading to a terminal 31 to which is connected the wire 15. The contact arm 8 is yieldingly connected to the bracket 27 by a flat spring 32 in order to give it the required pivotal motion. The spring normally retains the contact 10 out of contact with the contact 11. The contact 11 is mounted on a member 33 attached to the base plate 26, but insulated therefrom by the insulation 28 and connected to a plate 34 from which the wires 12 and 20 lead. This switch would preferably be placed under the bonnet of the vehicle as indicated at 36 in Figure 1, and supported in any convenient manner.

The operation is as follows:—

When the main light switch 3 is closed the circuit for the head lamps 2 is completed. At the same time the circuit from the battery 17 through the switch 3, wire 4, coil 1, and earth wire 5 is also closed, whereupon current flowing through the coil 1 will energize the core 25 which will attract the arm 8 and close the contacts 10 and 11, thereby completing a circuit from the battery by means of the wire 15, wire 14, coil 6, arm 8, wire 12, to the tail light 13.

Should the head lamps now be turned off by opening the switch 3, the tail light circuit will not be affected owing to the fact that, although current no longer flows through the coil 1, the current continues to flow through the coil 6 and contacts 10 and 11 to the tail light 13 and keeps the core 25 energized and so retains the arm 8 in its attracted position and the circuit to the tail light unbroken.

Before it is possible to switch off the tail light the push button 24 at the back of the vehicle must be pressed, thereby bringing the arm 19 into connection with contact 18, whereupon the shunt circuit from battery 17 is formed through wire 15, switch arm 19, wire 20, wire 12, to the tail light 13 and to earth. This circuit offering less resistance to current than the circuit through the coil 6, the major part of the current is thus shunted through this circuit, while the current through the coil 6 being now not sufficient to retain the arm in its attracted position, the path through contacts 11 and 12 is broken. Upon the press button 24 being released the spring arm 19 returns to open position and the circuit to the tail light through the shunt circuit is broken and the tail light thereby switched off.

Thus it will be necessary in order to switch off the tail light, for the motorist to leave his seat and go to the rear of the vehicle for this purpose.

Figure 5:
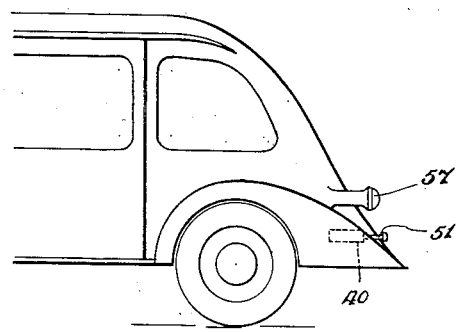
Figure 5 is a view showing the position of the device on a vehicle when a modified construction is employed.
Figure 6:
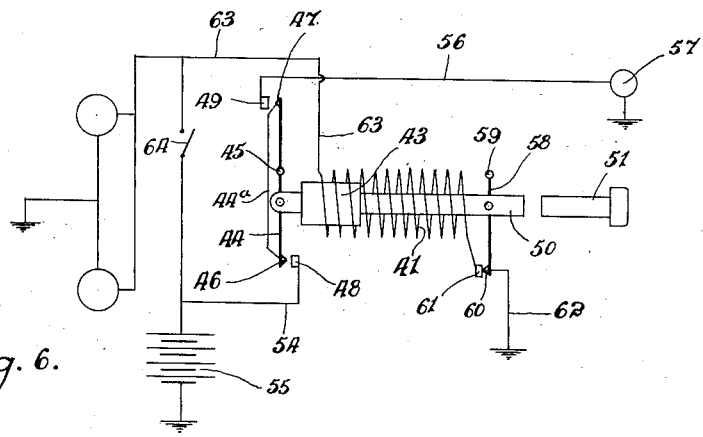
Figure 6 is a diagram of the electrical circuits of the modified form of the device.
Figure 7:
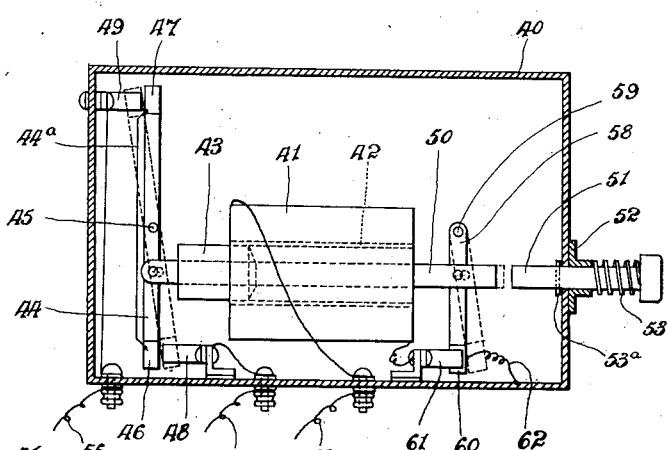
Figure 7 is a plan partly in section showing a construction for carrying out the modified device.

Referring to Figures 5 to 7, a casing 40 is mounted at a convenient position at the rear of the vehicle, and within this casing is mounted an electromagnet switch formed by means of a coil 41 which is supported in any convenient manner in the casing 40, and through the centre of which passes a tubular iron core 42. An armature 43 projects into one end of the tube 42 and is pivotally attached to a contact arm 44 (generic with arm 8), which is centrally pivoted on a pin 45 in the casing. The arm has contact ends 46 and 47 which are adapted to turn respectively into contact with spring grip contact terminals 48 and 49 fixed in the casing. A rod 50 from the armature extends through the coil.

A sliding push rod 51 in line with the rod 50 is guided in a socket 52 and under tension of a coil spring 53 which is sufficient to retain the rod in an outward position limited by a pin 53ª, but which will prevent it being shaken into closed position by vibrations in running.

The contact terminal 48 is connected by a wire 54 to the battery 55 (see Figure 6) while the terminal 49 is connected by a wire 56 to the tail light 57 which is earthed to the vehicle frame.

Another arm 58 is pivoted on a pin 59 in the casing and has a contact end 60 to enter spring grip contacts 61 to which one end of the coil 41 is wired. The arm 58 is earthed to the casing by means of a flex 62. The other end of the solenoid coil 41 is connected by a wire 63 to the light switch 64 on the instrument board of the vehicle. Both the arms 44 and 58 would be formed of insulating material, the contact ends 46 and 47 being connected by a wire 44ª.

The circuit can be followed from Figure 6.

When the light switch 64 is operated to switch on the vehicle lamps the circuit is completed from the battery 55 along wire 63 to the coil 41, contacts 61 and 60 to earth. The current, however, in passing through the coil has energized the core and drawn the armature 43 inwards and operated the pivoted contact arm 44, so that its contact ends will engage the spring contacts 48 and 49, as indicated by dotted lines in Figure 7, thus forming a path for current to flow from the battery through the wire 44ª and wire 56 to the tail light 57. This movement of the rod 50 has also operated the arm 58 out of engagement with the spring contact grips 61 and broken the circuit through the coil, the rod 50, and arm 44 remaining in the position shown in dotted lines by virtue of the contact ends of the arm being gripped by the spring contacts 48 and 49. Upon the head lamp circuit now being broken by the operation of the switch 64, the circuit from the battery through the contacts 46 and 47 to the tail light is not affected. In order to disconnect the arm 44 the push rod 51 must be pressed and this movement will operate the rod 50 and rock the arm 44 clear of the contacts 48 and 49, and also cause the arm 58 to reconnect with the contact 61.

What I claim is:—

In means for controlling the tail light of motor vehicles, an electro-magnetic coil, a contact arm controlled by said coil to close contacts connected to the battery and to the tail light, said coil being energized by current from the battery through the light switch, means to retain said arm in circuit closing position, said retaining means consisting of an electro-magnetic coil to attract said arm, said coil being connected to the battery on the battery side of the light switch so that the current will continue to pass to the coil after the light switch is opened and thereby retain said arm in a position whereby the said contacts remain closed and the circuit to the tail light unbroken, and a normally open control switch arranged exteriorly of the vehicle body and connected on one hand to the battery and on the other hand to the tail light between the latter and said contacts, the closing of said switch shunting out the second mentioned coil to release said arm and open the contacts, and retaining the tail light operative in case of jamming of said switch, said tail light also being maintained in operative condition irrespective of said control switch as long as the second mentioned coil is energized.

JAMES FREDERICK BATES.